United States Patent
Veeneman

(10) Patent No.: US 7,113,482 B1
(45) Date of Patent: Sep. 26, 2006

(54) SYSTEMS AND METHODS FOR PERFORMING DSL LOOP QUALIFICATION

(75) Inventor: Dale E. Veeneman, Southborough, MA (US)

(73) Assignee: Verizon Laboratories Inc., Waltham, MA (US)

( * ) Notice: Subject to any disclaimer, the term of this patent is extended or adjusted under 35 U.S.C. 154(b) by 851 days.

(21) Appl. No.: 09/656,868

(22) Filed: Sep. 7, 2000

(51) Int. Cl.
*G06F 11/00* (2006.01)

(52) U.S. Cl. ..................................... 370/248

(58) Field of Classification Search .............. 370/241, 370/252, 248, 250; 375/224; 379/22.02, 379/27.01, 27.03; H04M 3/22; H04J 3/16
See application file for complete search history.

(56) References Cited

U.S. PATENT DOCUMENTS

| | | | |
|---|---|---|---|
| 6,209,108 B1 | 3/2001 | Pett et al. .................... 714/43 |
| 6,266,395 B1 * | 7/2001 | Liu et al. .................. 379/27.01 |
| 6,463,126 B1 * | 10/2002 | Manica et al. ........... 379/27.01 |
| 6,466,647 B1 * | 10/2002 | Tennyson ................... 379/1.04 |
| 6,625,255 B1 * | 9/2003 | Green et al. ............... 379/1.04 |
| 6,633,545 B1 * | 10/2003 | Milbrandt ................... 370/252 |

OTHER PUBLICATIONS

Transmission Systems For Communications, Bell Laboratories, 5th Edition, 1982, pp. 231-232.*

* cited by examiner

*Primary Examiner*—Huy D. Vu
*Assistant Examiner*—Jason Mattis

(57) ABSTRACT

A system predicts digital subscriber line (DSL) performance on an existing telephone loop. The system obtains a topological description of the existing telephone loop (410) and identifies a loop equivalent to the existing telephone loop from the topological description of the existing telephone loop (440). The system then determines DSL performance for the equivalent loop (450). From the DSL performance for the equivalent loop, the system predicts DSL performance for the existing telephone loop (460).

29 Claims, 11 Drawing Sheets

SYSTEMS AND METHODS FOR PERFORMING DSL LOOP QUALIFICATION

BACKGROUND OF THE INVENTION

A. Field of the Invention

The present invention relates generally to digital subscriber line (DSL) systems and, more particularly, to systems and methods that predict performance of DSL service on arbitrary telephone loops.

B. Description of Related Art

Digital subscriber line (DSL) technologies use sophisticated modulation schemes to pack data onto existing copper telephone lines (i.e., plain old telephone service (POTS) lines). DSL technologies are sometimes referred to as last-mile technologies because they are used only for connections from a central office to a home or office, not between central offices.

It is envisioned that DSL service will be provided over a majority of the existing copper telephone lines or loops. One of the more difficult aspects of providing DSL service is predicting which customer loops cannot support the DSL service, which customer loops can support the service, and predicting what level of service (e.g., data rates) these latter loops can support. Conventional systems roughly estimate the level of service supportable by these loops by performing metallic line tests to estimate the lengths of the loops. These tests, however, cannot determine the wire gauges of the loops or the presence of bridged taps. Both of these factors can have a major impact on DSL performance, leading to possibly inaccurate estimations by the conventional systems.

As a result, a need exists for a method that more accurately predicts the level of DSL performance supportable by existing copper loops.

SUMMARY OF THE INVENTION

Systems and methods consistent with the present invention address this need by providing accurate DSL performance predictions by considering physical loop characteristics that determine the transmission capacity of a copper loop connecting the customer to the central office and the spectral interference associated with the loop (i.e., the external noise disturbances that further affect the transmission capacity of the loop).

In accordance with the purpose of the invention as embodied and broadly described herein, a system predicts digital subscriber line (DSL) performance on an existing telephone loop. The system obtains a topological description of the existing telephone loop and identifies a loop equivalent to the existing telephone loop from the topological description of the existing telephone loop. The system then determines DSL performance for the equivalent loop. From the DSL performance for the equivalent loop, the system predicts DSL performance for the existing telephone loop.

In another implementation consistent with the present invention, a method estimates digital subscriber line (DSL) performance on a telephone line. The method includes identifying an equivalent straight cable that corresponds to the telephone line; determining DSL performance on the straight cable; and estimating DSL performance on the telephone line based on the determined DSL performance on the straight cable.

In yet another implementation consistent with the present invention, a method predicts asymmetric digital subscriber line (ADSL) performance on an existing telephone loop. The method includes determining characteristics and operating conditions of the existing telephone loop; calculating ADSL capacity of the existing telephone loop based on the determined characteristics; identifying an equivalent loop based on the ADSL capacity and the determined operating conditions of the existing telephone loop; determining ADSL performance on the equivalent loop; and predicting ADSL performance on the existing telephone loop from the determined ADSL performance on the equivalent loop.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

The following detailed description will be described in terms of digital subscriber line (DSL) service and, in particular, in terms of asymmetric DSL (ADSL) service. In other implementations consistent with the present invention, other types of DSL service may be used. According to the ADSL standard, the downstream transmission of data (i.e., from a server to a client) is typically much faster than the upstream transmission (i.e., from the client to the server).

Figure 1:
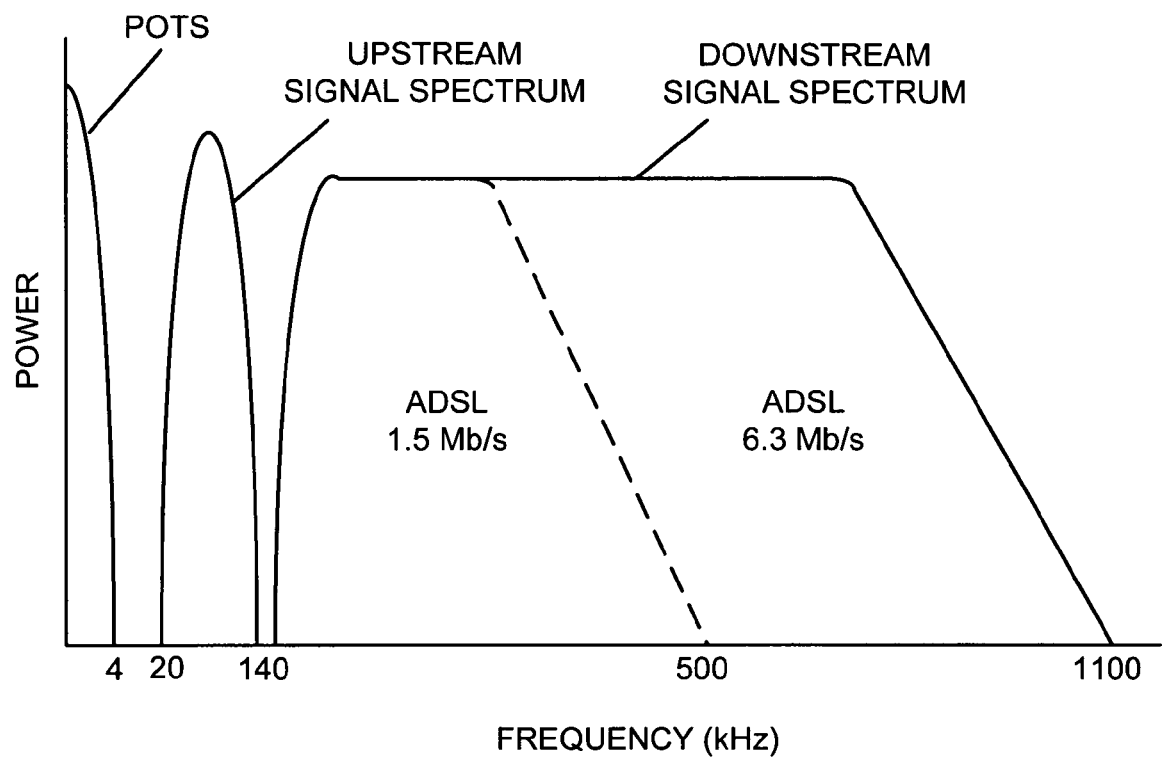
FIG. 1 is a graph of frequency versus power for data transmission according to the asymmetric DSL (ADSL) standard.

The upstream and downstream channels may be considered as two independent paths. FIG. 1 is a graph of frequency versus power for data transmission according to the ADSL standard. According to the standard, POTS transmissions use frequencies up to approximately 4 kHz. Upstream ADSL transmissions use frequencies from about 20 kHz to 140 kHz and downstream transmissions use frequencies from about 140 kHz to 1.1 MHz.

Systems and methods consistent with the present invention predict DSL performance for existing telephone loops by considering physical loop characteristics and spectral interference associated with the loops. These considerations lead to more accurate predictions of the DSL performance over the estimations of conventional systems.

EXEMPLARY NETWORK

Figure 2:
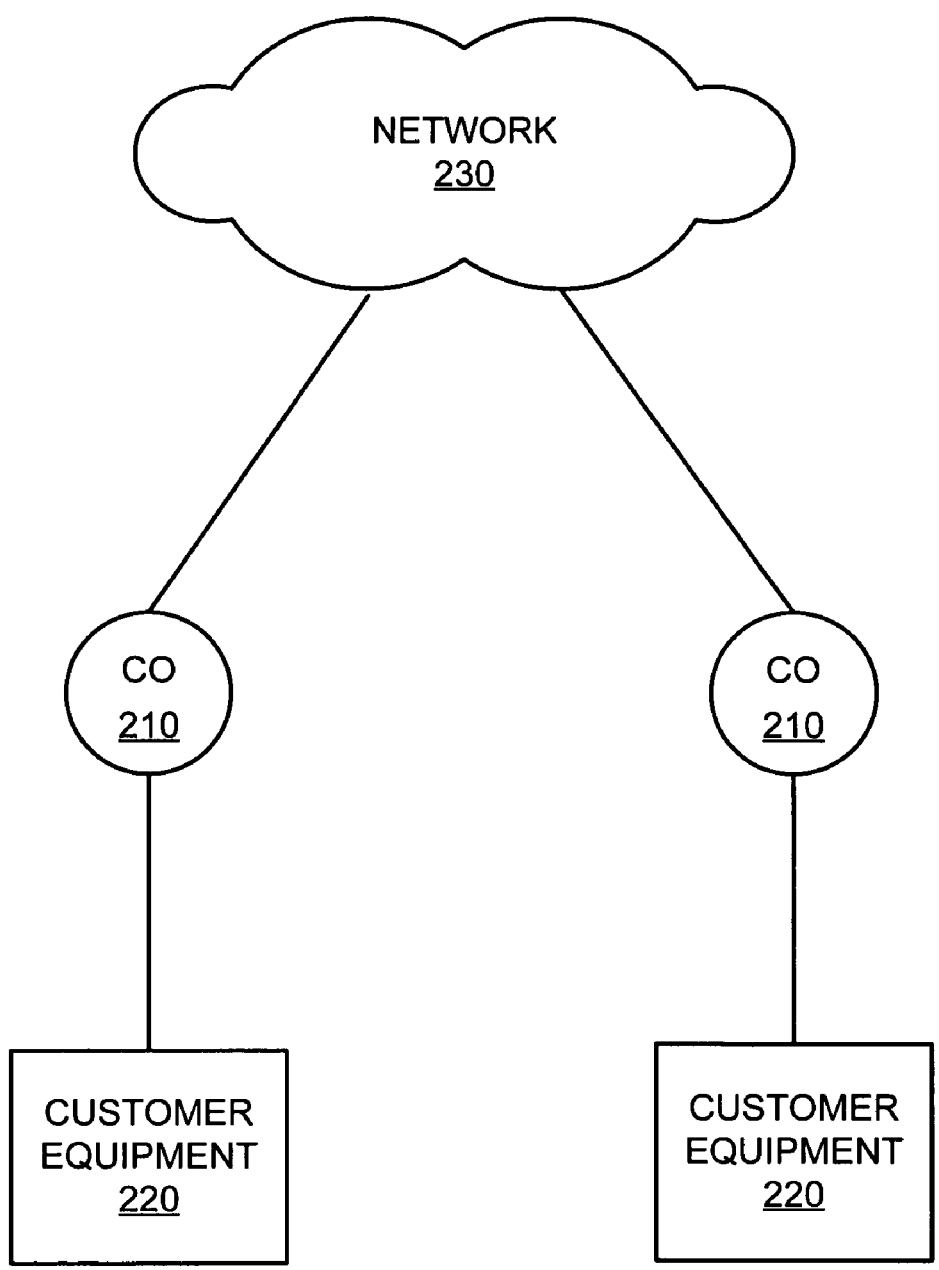
FIG. 2 is an exemplary diagram of a network upon which systems and methods consistent with the present invention may operate.

FIG. 2 is an exemplary diagram of a network 200 upon which systems and methods consistent with the present invention may operate. The network 200 may include central offices 210 connected to customer equipment 220 and a network 230. The central offices 210 may include conventional telephone switches that connect the customer equipment 220 to the network 230 for communication. The customer equipment 220 may include a telephone, a personal computer, or another type of communications device. The customer equipment 220 may connect to the central offices 210 via standard copper twisted pair telephone lines or loops. The network 230 may include one or more networks, including a public telephone network, such as the public switched telephone network (PSTN), or another type of network, such as the Internet.

EXEMPLARY DEVICE

Figure 3:
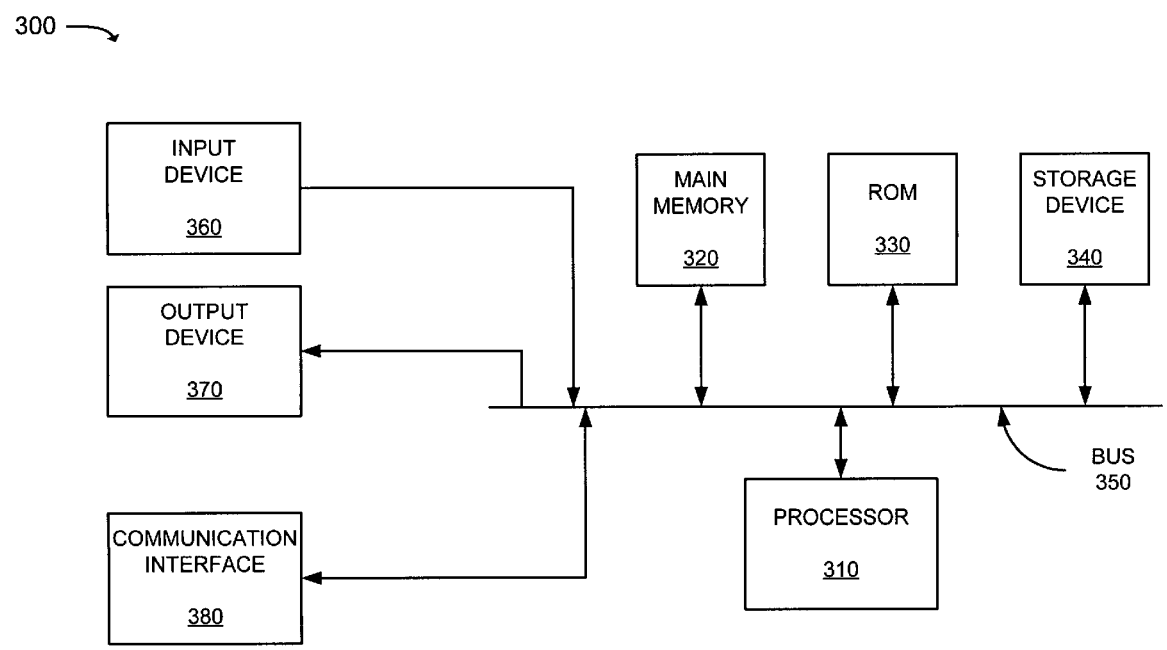
FIG. 3 is a diagram of an exemplary device on which systems and methods consistent with the present invention may be implemented.

FIG. 3 is a diagram of an exemplary device 300 on which systems and methods consistent with the present invention may be implemented. The device 300 includes a processor 310, main memory 320, a read only memory (ROM) 330, storage device 340, bus 350, input device 360, output device 370, and communication interface 380.

The processor 310 may include any type of conventional processing device that interprets and executes instructions. Main memory 320 may include a random access memory (RAM) or a similar dynamic storage device. Main memory 320 stores information and instructions for execution by processor 310. Main memory 320 may also be used for storing temporary variables or other intermediate information used during execution of instructions by processor 310. ROM 330 stores static information and instructions for use by the processor 310. It will be appreciated that ROM 330 may be replaced with some other type of static storage device. The storage device 340 may include any type of magnetic and/or optical recording medium and its corresponding drive. Storage device 340 may store data and instructions for use by the processor 310. The bus 350 may include a set of hardware lines (i.e., conductors) that allows for data transfer among the components of the device 300.

The input device 360 may include one or more conventional devices that permit an operator to interact with the device 300, such as a keyboard, a mouse, biometric mechanisms, etc. The output device 370 may include one or more conventional devices that present information from the device 300 to the operator, such as a printer, a monitor, a pair of speakers, etc.

The communication interface 380 permits the device 300 to communicate with other devices/systems via any communications medium. For example, the communication interface 380 may include a modem or an Ethernet interface to a LAN. Alternatively, the communication interface can include any other interface that enables communication between the device 300 and other devices or systems.

As will be described in detail below, a device 300, consistent with the present invention, predicts ADSL performance on existing telephone loops. The device 300 may perform this task in response to the processor 310 executing sequences of instructions contained in a computer-readable medium, such as memory 320. A computer-readable medium may include one or more memory devices and/or carrier waves. The instructions may be read into the computer-readable medium from another computer-readable medium, such as the storage device 340, or from another device via the communication interface 380.

Execution of the sequences of instructions contained in memory 320 causes the processor 310 to perform processes that will be described later. Alternatively, hardwired circuitry may be used in place of or in combination with software instructions to implement processes consistent with the present invention. Thus, the present invention is not limited to any specific combination of hardware circuitry and software.

EXEMPLARY PROCESSING

Figure 4:
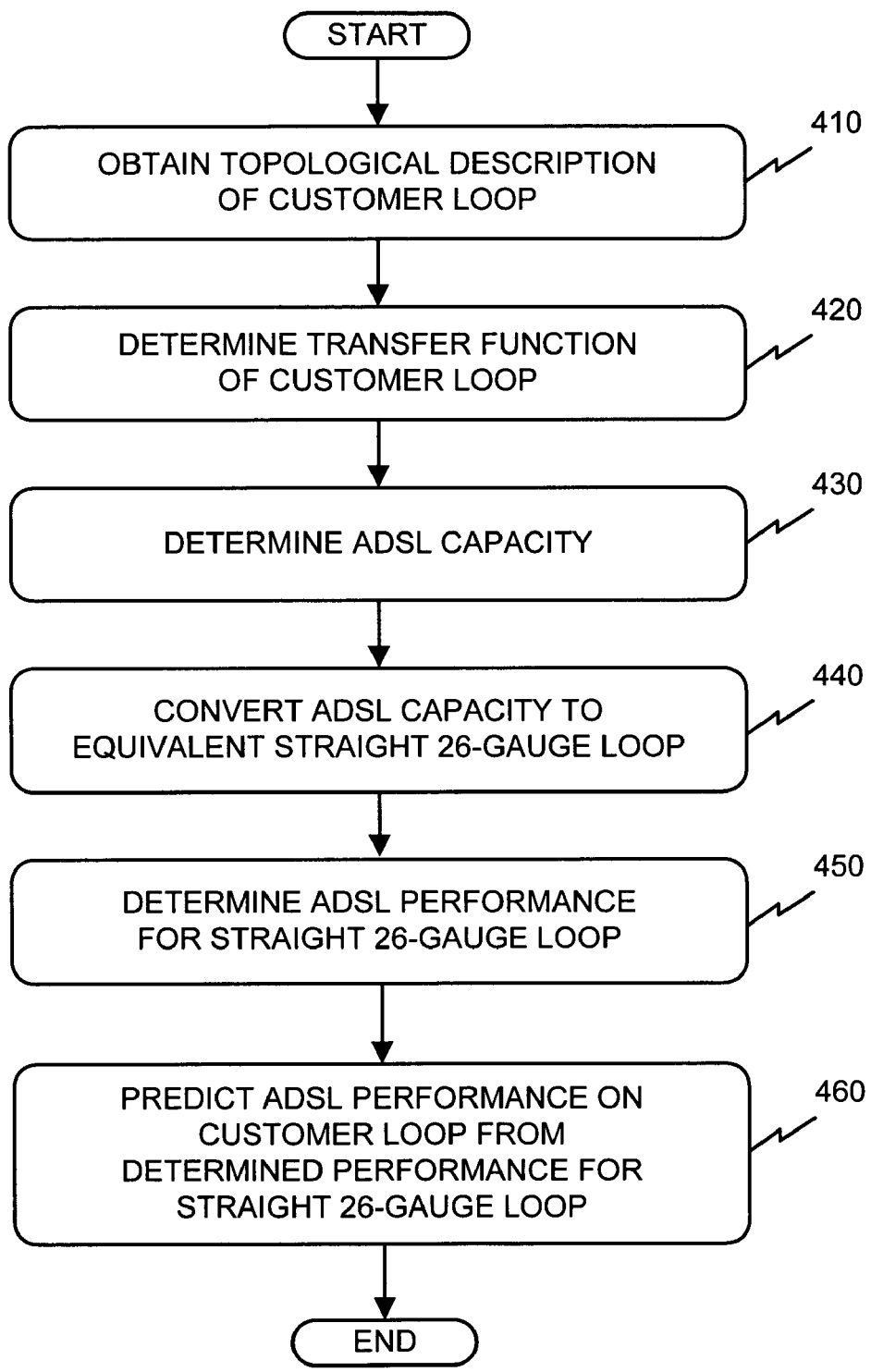
FIG. 4 is a flowchart of exemplary processing for predicting ADSL performance on an arbitrary customer loop.

FIG. 4 is an exemplary flowchart of processing for predicting ADSL performance on an arbitrary customer loop. One of ordinary skill in the art may appreciate that this processing may be performed by the device 300 or one or more other devices.

Processing may begin with the device 300 obtaining a topological description of the customer loop [step 410]. The topological description may include such factors as the operating frequency, length, gauge, temperature, and insulation type of the loop. The device 300 may obtain the topological description by operator input, database retrieval, or other ways. For example, information regarding a particular customer loop may be stored in a database or the information may be gathered by a line technician who inspects the loop to determine the topological information.

The device 300 may then determine the transfer function of the customer loop [step 420], possibly based on the loop's insertion loss. A loop's insertion loss may increase with frequency, length, and gauge (e.g., a 26-gauge cable is smaller and has more loss than a 24-gauge cable). Temperature and insulation type have less effect on loss. Straight lengths of cable have a smoothly monotonic increase in loss with frequency (i.e., more negative on a dB scale), while bridged-taps on a loop introduce spectral nulls, giving a dip in the loss curve. Straight cables, also known as straight-through cables, have each internal twisted pair of wires connected to the same pin number at each end of the cable.

The device 300 may determine the loop's insertion loss using the physical constants R (resistance), L (inductance), C (capacitance), and G (conductance) that characterize the type of twisted pair wire in the customer loop. The constants are functions of frequency, gauge, temperature, and insulation type for a given length of cable and are available as tables (for example as an appendix in the ISDN Standard, T1.601).

Given the twisted-pair physical constants, the propagation constant of a loop may be defined as:

$$\gamma(\omega) = \sqrt{(R+j\omega L)(G+j\omega C)}$$

and the characteristic impedance may be defined as:

$$Z_0(\omega) = \sqrt{\frac{(R+j\omega L)}{(G+j\omega C)}}.$$

Figure 5:
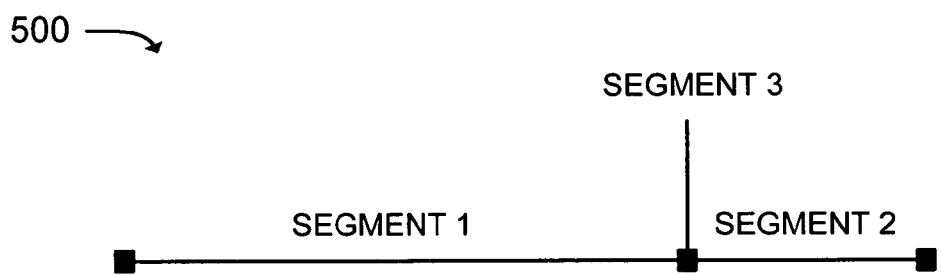
FIG. 5 is an exemplary diagram of a three segment cable that includes a bridged-tap.

FIG. 5 is an exemplary diagram of a three segment cable 500 that includes a bridged-tap. The device 300 may use a three-port network model to determine the complex transfer function, H(f), of the cable 500 from:

$$H(f) = \frac{Z_{02}}{Z_{01} + Z_{02} + (Z_{01}Z_{02})Z_{bt}^{-1}} e^{-\gamma_1 d_1} e^{-\gamma_2 d_2},$$

where $d_x$ is the length of segment x and the bridged-tap impedance is:

$$Z_{bt} = Z_{03} \frac{\cosh(\gamma_3 d_3)}{\sinh(\gamma_3 d_3)}.$$

The device 300 may determine the transfer function of the customer loop by assembling appropriate three-segment pieces of cable. The insertion loss is then the real part of H(f), expressed in dB.

Figure 6:
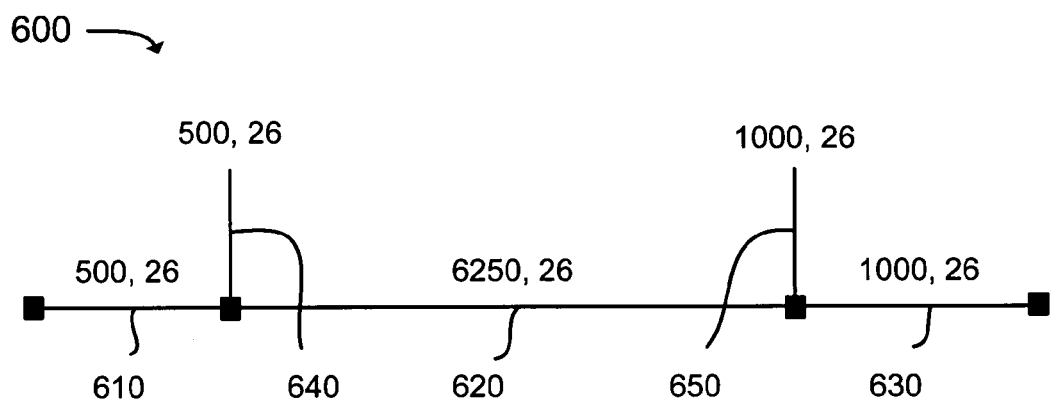
FIGS. 6 and 7 are diagrams of two exemplary loops with bridged-taps.
Figure 7:
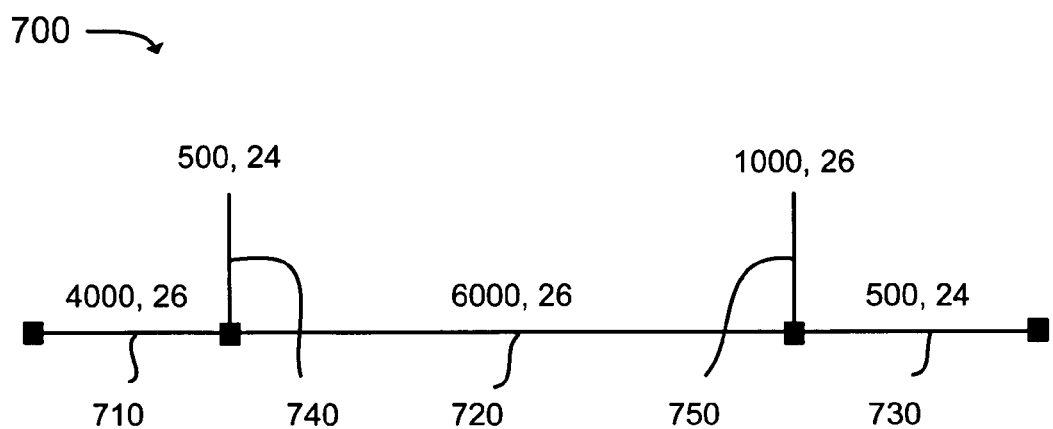

From the transfer function H(f), the device 300 may determine the ADSL capacity of the customer loop [step 430]. Consider, for example, two loops with bridged taps. FIGS. 6 and 7 are diagrams of these two exemplary loops 600 and 700, respectively. The loop 600 includes five segments 610–650. Each of the segments 610 and 640 includes a 26-gauge cable, 500 feet (152.4 meters) in length. The segment 620 includes a 26-gauge cable, 6250 feet (1905 meters) in length. Each of the segments 630 and 650 includes a 26-gauge cable, 1000 feet (304.8 meters) in length.

The loop 700 also includes five segments 710–750. The segment 710 includes a 26-gauge cable, 4000 feet (1219.2 meters) in length. The segment 720 includes a 26-gauge cable, 6000 feet (1828.8 meters) in length. Each of the segments 730 and 740 includes a 24-gauge cable, 500 feet (152.4 meters) in length. The segment 750 includes a 26-gauge cable, 1000 feet (304.8 meters) in length.

Figure 8:
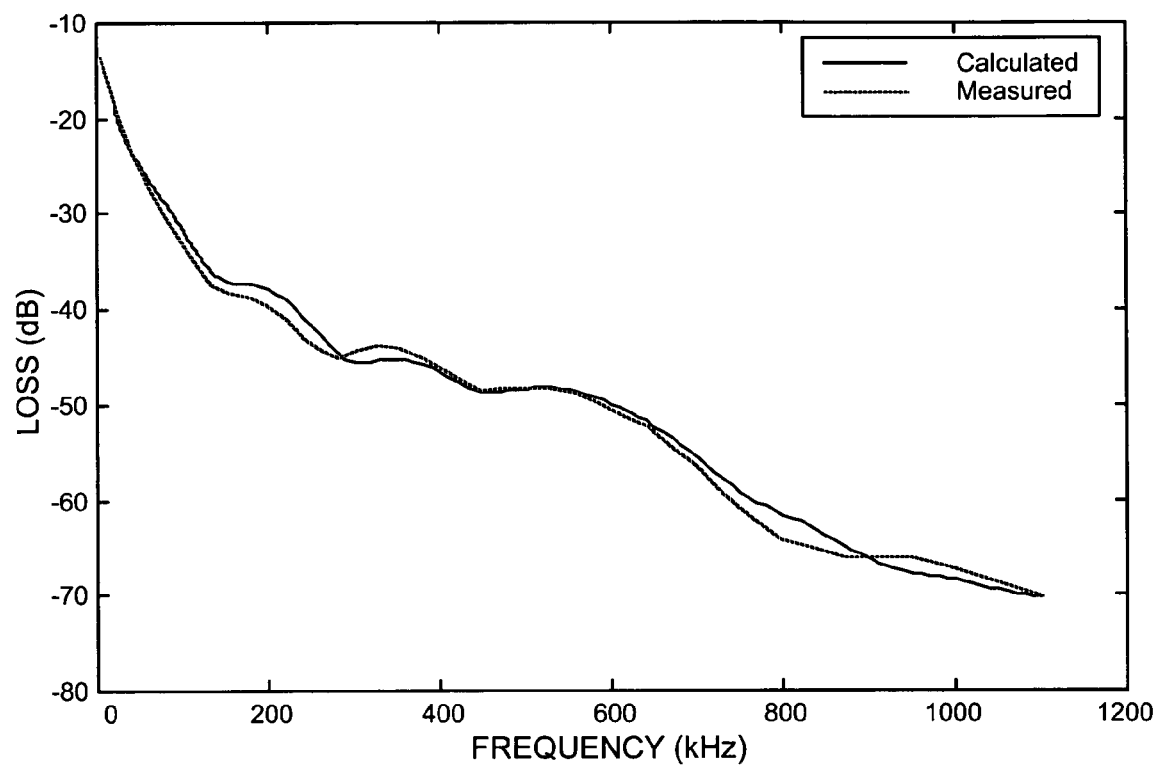
FIGS. 8 and 9 are graphs that illustrate calculated and measured insertion loss for the two exemplary loops of FIGS. 6 and 7, respectively.
Figure 9:
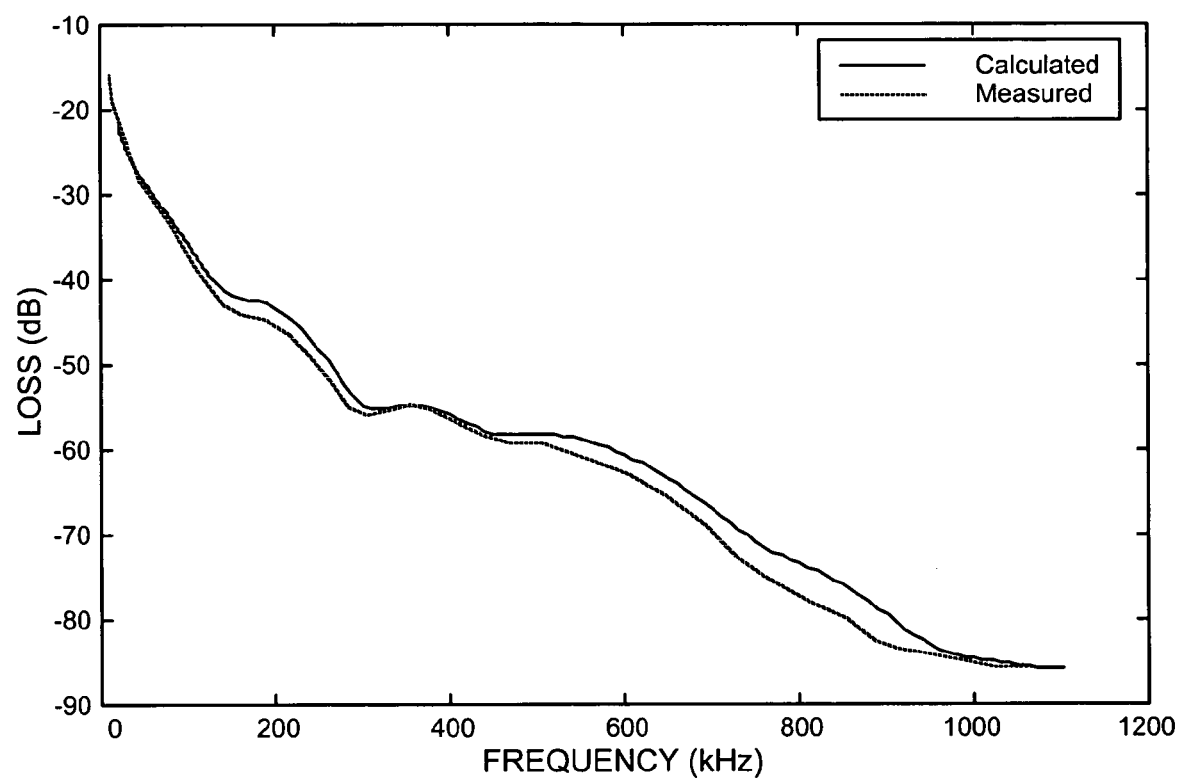

FIGS. 8 and 9 are graphs that illustrate calculated and measured insertion loss for loops 600 and 700, respectively. The measurements were taken in an ADSL test bed using twisted pair cables on spools. As shown by the figures, the match between the calculated and measured loss is fairly close, considering that the values of the physical constants R, L, C, and G given by the ISDN Standard, T1.601 may not exactly match the cable in the test bed.

ADSL modems cannot generally use frequencies with losses below −80 dB. Thus, the device 300 may determine the loop's ADSL capacity by integrating the loss curve, such as the loss curves shown in FIGS. 8 and 9, for all frequencies with losses between −80 and 0 dB (i.e., the area below the curve down to −80 dB). Because the upstream and downstream paths differ for ADSL service, the device 300 may treat the upstream and downstream paths separately, as two independent paths. In other words, the device 300 may determine the ADSL capacity for each of the upstream and downstream paths. Assume, for example, that the device 300 determines the capacity of the upstream and downstream paths of loop 600 (FIG. 6) from the graph shown in FIG. 8 as 6193.56 and 2518.31, respectively.

The device 300 may then convert the ADSL capacity to an equivalent straight 26-gauge loop [step 440]. The device 300 may accomplish this conversion by an inverse table look-up operation or by other ways. For example, a table may be created that relates different lengths of straight 26-gauge cables to ADSL capacity. The table may be created by performing ADSL capacity determinations for a large number of lengths of straight 26-gauge cable to derive the relationship between 26-gauge length and capacity. Then for an arbitrary customer loop, the device 300 may determine the loop's capacity and compare it to the equivalent capacity for a given length of a 26-gauge loop.

From the ADSL capacities of the upstream and downstream paths of the loop 600, assume, for example, that the device 300 determines that the equivalent length of the upstream path is a straight 26-gauge cable, 9407 feet (2867.2536 meters) in length and the equivalent length of the downstream path is a straight 26-gauge cable, 9030 feet (2752.344 meters) in length.

Figure 10:
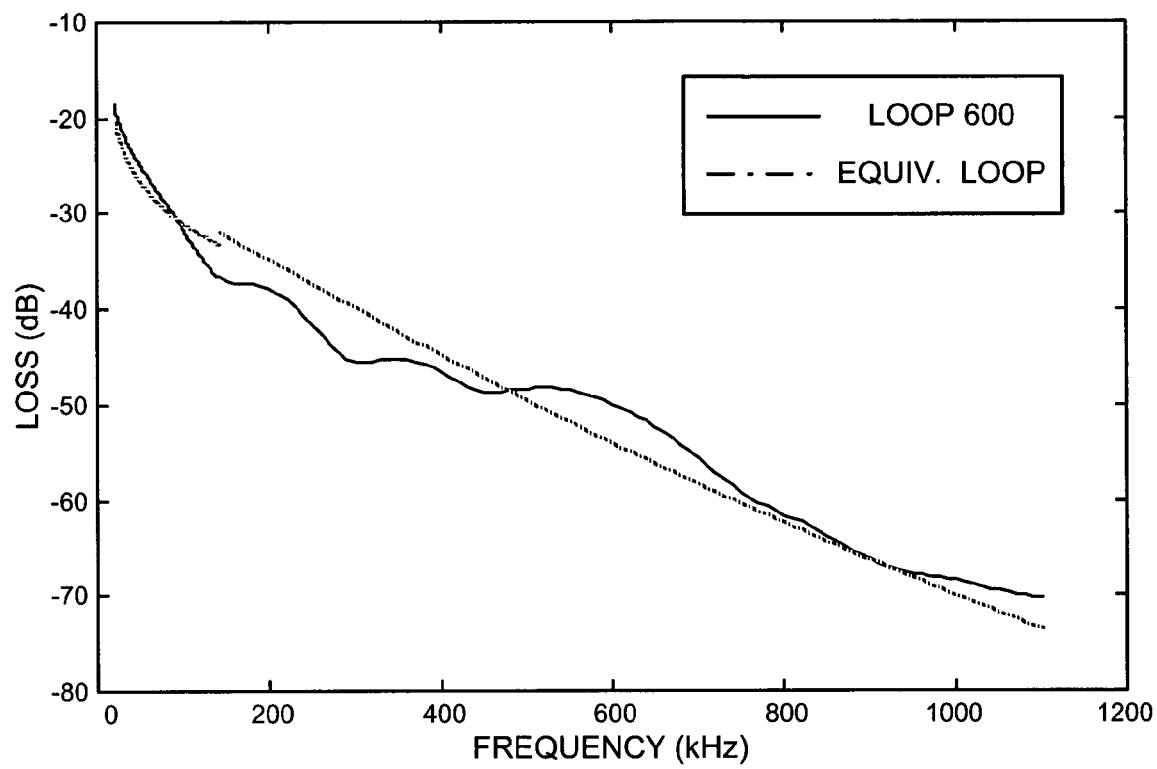
FIG. 10 is a graph that illustrates loss curves for the loop of FIG. 6 and an equivalent straight 26-gauge cable.

FIG. 10 is a graph that illustrates loss curves for the loop 600 and the equivalent straight 26-gauge cable. In the graph, the solid line corresponds to the loop 600 and the broken dotted line corresponds to the equivalent straight 26-gauge cable for the upstream and downstream frequency bands. As the graph shows, the equivalent straight 26-gauge cable has an insertion loss similar to the loop 600.

The device 300 may consider several factors in determining the appropriate length of the straight 26-gauge cable. For example, bridged-taps, gauge, temperature, and insulation may be factors that the device 300 uses to determine the cable length.

Figure 11:
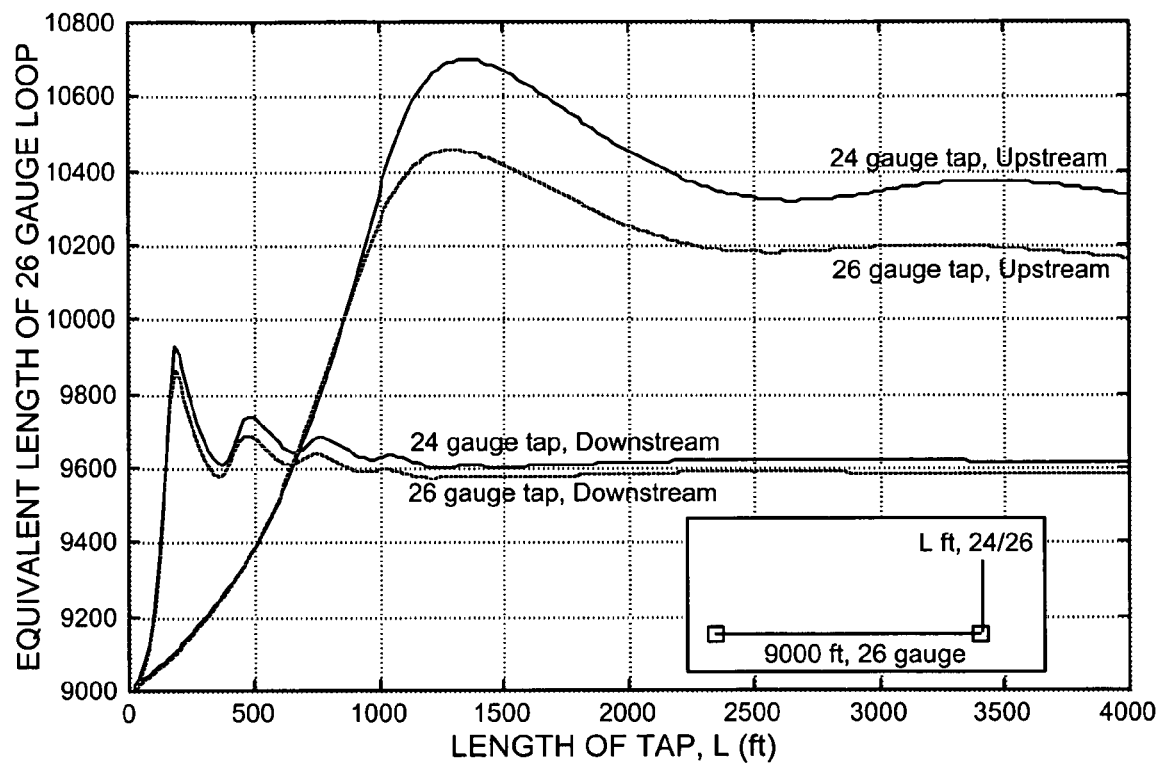
FIG. 11 is a graph that illustrates the effect of bridged-taps on the length of a straight 26-gauge cable.

FIG. 11 is a graph that illustrates the effect of bridged-taps on the length of a straight 26-gauge cable. The graph shows an equivalent 26-gauge length of two cables, both 9000 feet (2743.2 meters) of 26-gauge cable with either a 24 or 26-gauge bridged-tap. The equivalent 26-gauge length is plotted against the length of the bridged-tap. For the downstream path, below about 50 feet (15.24 meters) of bridged-tap, the effect of the tap may simply be added on to the loop length. At about 200 feet (60.96 meters) of tap, however, the downstream effect is magnified almost by five. Both gauges of tap eventually reach a constant downstream impact at between 600 and 700 feet (between 182.88 and 213.36 meters) of 26-gauge cable, regardless of their length. The taps need to be longer to affect the upstream path, but the overall impact may be greater. With a 1300 foot (396.24 meter) tap, an equivalent upstream length of 1450–1700 feet (441.96–518.16 meters) may be added to the loop. Tap locations other than at the cable end, or multiple taps, may give different results.

The effect of gauge, temperature, and insulation may be more linear. Table 1 shows the possible impact of changing the gauge, temperature, or insulation of an exemplary cable, such as a 26-gauge, 70° F., plastic insulated cable (PIC).

TABLE 1

| Direction | Gauge from 26 to 24 | Temp. from 70° to 120° | Insulation from PIC to Pulp |
|---|---|---|---|
| Downstream | 1.43 | 0.92 | 0.99 |
| Upstream | 1.28 | 0.94 | 0.92 |

From Table 1, the result of changing from 26 to 24-gauge cable is a 43% increase in downstream reach and a 28% increase in upstream reach. The result of increasing temperature from 70° F. to 120° F. decreases the downstream reach by 8% and the upstream reach by 6%. The result of changing the insulation from PIC to pulp decreases the downstream reach by 1% and the upstream reach by 8%.

Once the device 300 identifies the equivalent straight 26-gauge loop, the device 300 determines the ADSL performance for the straight loop [step 450]. The device 300 may make this determination from previously-obtained ADSL performance data. For example, the device 300, or one or more separate devices, may perform tests or simulations on straight 26-gauge loops of various lengths under various crosstalk conditions to determine ADSL performance.

The device 300 may then use the performance data or record it in a memory, database, or table for later retrieval.

Figure 12:
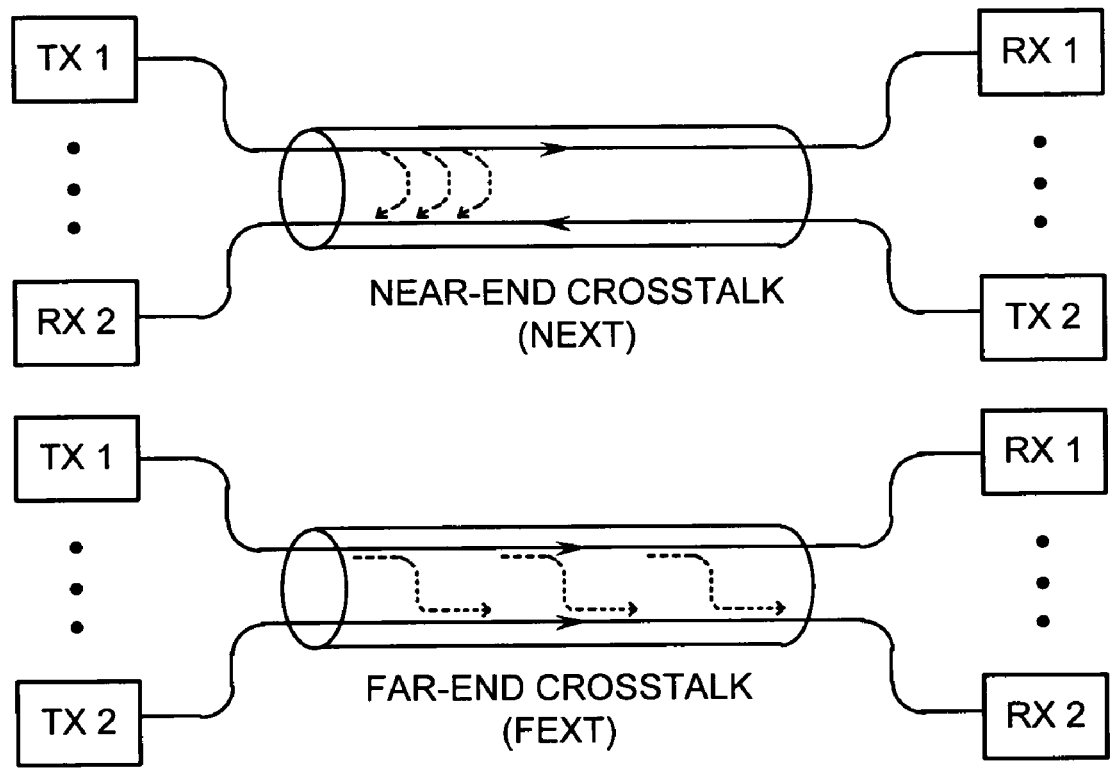
FIG. 12 is a diagram that illustrates two possible crosstalk situations.

Twisted-pair cables are typically bundled together into binders when they are deployed. Electromagnetic coupling between nearby pairs causes crosstalk of the signal on one pair into another pair. FIG. 12 is a diagram that illustrates various crosstalk situations. When a receiver is subjected to crosstalk by a transmitter in a nearby location, it is called near-end crosstalk (NEXT). When the interfering transmitter is at the far location, it is called far-end crosstalk (FEXT). FEXT power may be attenuated by the distance to the receiver. NEXT power, however, may not be distance-attenuated and may have a greater impact on the weaker received signal. Self-NEXT occurs when the near-end crosstalk is from a similar line code (i.e., occupying the same portion of the spectrum).

Figure 13:
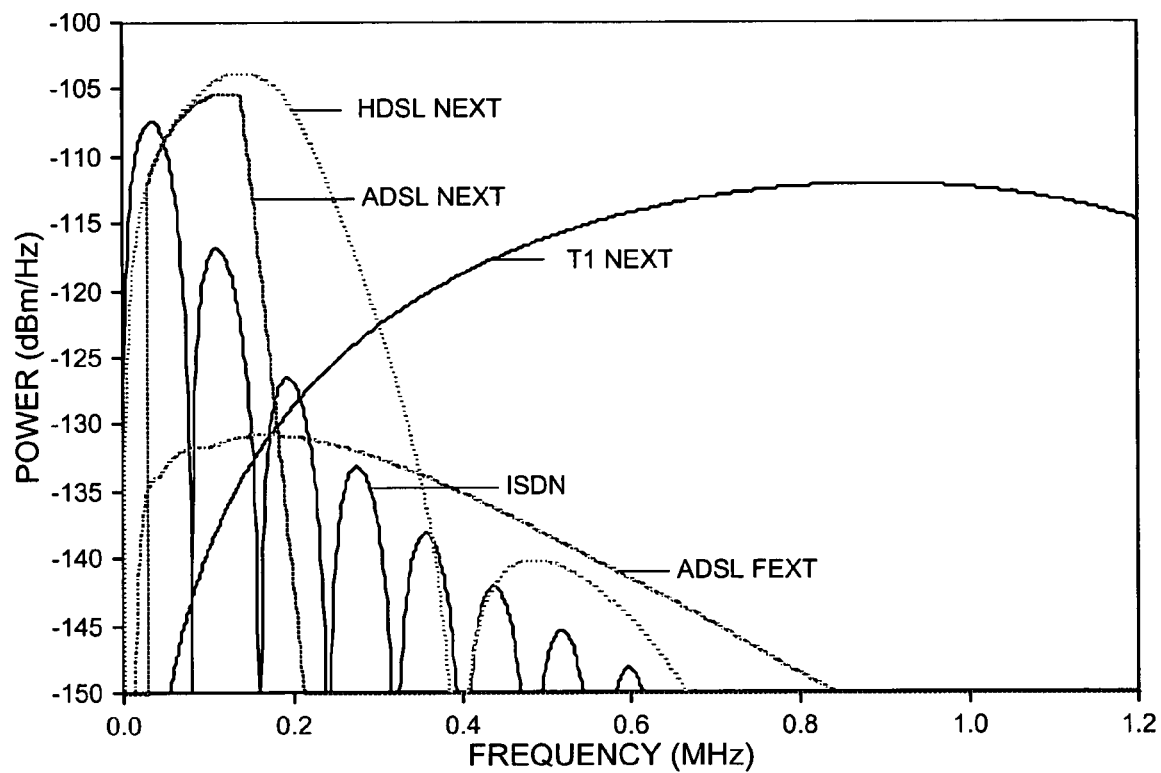
FIG. 13 is a graph that illustrates power spectral density (PSD) associated with potential crosstalk interferers.

Significant sources of crosstalk to ADSL (and vice versa) include integrated services digital network (ISDN), high-bit-rate DSL (HDSL), T1, and ADSL itself. FIG. 13 is a graph that illustrates power spectral density (PSD) of the crosstalk seen by a pair from one line of each of the interferers. T1 is a special case. Its crosstalk is known to be so harmful to ADSL that it is typically recommended that no T1 pairs occupy the same binder with ADSL. The graph shows the PSD of T1 crosstalk from an adjacent binder. The PSD of the ADSL NEXT and FEXT are shown for the downstream transmission.

The frequency allocation for ADSL (as specified by the standard) was shown in FIG. 1. From the graph of FIG. 13, it is apparent that T1 NEXT is the worst interferer for downstream ADSL transmission and HDSL NEXT is the worst for upstream ADSL transmission (band from 20 to 140 kHz). ADSL NEXT is generally not a problem for upstream ADSL in a frequency division multiplexed (FDM) ADSL system (as shown in FIG. 1, the upstream and downstream frequencies do not overlap), but can be a problem for echo-canceled systems where the frequencies do overlap.

In one implementation consistent with the present invention, the test conditions for determining the ADSL performance of the straight 26-gauge cables include: 384 Kbps upstream against 24 ISDN lines; 64 Kbps upstream against 20 HDSL lines; and 1.5 Mbps downstream against 4 adjacent T1 lines. To predict performance, tables of performance for the specific modem used in the field may be generated.

Table 2 shows predicted and actual speedport margins against the various crosstalk conditions for loops 600 (FIG. 6) and 700 (FIG. 7). A 2 dB accuracy of predicted margin corresponds to about 500 feet (152.4 meters) of equivalent cable length.

TABLE 2

| Condition | Loop 600 | | Loop 700 | |
| --- | --- | --- | --- | --- |
| | Predicted | Measured | Predicted | Measured |
| 24 ISDN-Up (384K) | 15.2 | 15.37 | 11.0 | 10.38 |
| 20 HDSL-Up (64K) | 15.0 | 12.93 | 11.0 | 11.06 |
| 4 Adj. T1-Down (1.5M) | 11.5 | 9.1 | 3.4 | 1.07 |

Using the ADSL performance for the equivalent straight 26-gauge loop, the device 300 predicts the ADSL performance on the customer loop [step 460]. In some implementations consistent with the present invention, the device 300 also uses information regarding the spectral interference conditions associated with the customer loop. The device 300 may obtain this information from a human operator, a database, or some other source. In alternate implementations, the device 300 may use a worst-case or average performance estimate as the predicted ADSL performance.

CONCLUSION

Systems and methods consistent with the present invention accurately predict DSL performance on existing telephone loops by considering the physical characteristics of the loops and the spectral interference associated with the loops.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while the equivalent straight cable has been described as a 26-gauge cable, in other implementations consistent with the present invention, the cable may include cable of another gauge. The scope of the invention is defined by the claims and their equivalents.

What is claimed is:

1. A method for predicting digital subscriber line (DSL) performance on an existing telephone loop, comprising:
    obtaining a topological description of the existing telephone loop;
    determining a DSL capacity of the existing telephone loop from the topological description of the existing telephone loop,
    identifying an equivalent loop being different from the existing telephone loop, being limited to a straight physical loop of a particular length and a particular gauge, and being equivalent to the existing telephone loop based on the topological description of the existing telephone loop wherein the identifying includes using the DSL capacity to identify the equivalent loop;
    determining DSL performance for the equivalent loop by considering physical characteristics of the equivalent loop; and
    predicting DSL performance for the existing telephone loop based on the determined DSL performance for the equivalent loop.

2. The method of claim 1, wherein the obtaining includes:
    receiving at least one of a frequency, length, gauge, temperature, or insulation type associated with the existing telephone loop.

3. The method of claim 1, further comprising:
    determining an insertion loss for the existing telephone loop based on the topological description of the existing telephone loop.

4. The method of claim 3, further comprising:
    determining a DSL capacity of the existing telephone loop using the insertion loss for the existing telephone loop.

5. The method of claim 4, wherein the determining a DSL capacity includes:
    creating a loss curve using the insertion loss, and
    integrating the loss curve to determine the DSL capacity of the existing telephone loop.

6. The method of claim 4, wherein the determining a DSL capacity includes:
creating a loss curve based on the insertion loss over a plurality of frequencies, and
determining an area below the loss curve over the plurality of frequencies, the area corresponding to the DSL capacity of the existing telephone loop.

7. The method of claim 4, wherein the existing telephone loop includes an upstream path and a downstream path; and wherein the determining a DSL capacity includes:
separately determining the DSL capacity for each of the upstream and downstream paths.

8. The method of claim 1, wherein the existing telephone loop includes an upstream path and a downstream path; and wherein the determining a DSL capacity includes:
separately determining the DSL capacity for each of the upstream and downstream paths.

9. The method of claim 8, wherein the identifying includes:
determining equivalent loops corresponding to each of the upstream and downstream paths.

10. The method of claim 1, wherein the using includes:
locating the DSL capacity in a table, and
finding the equivalent loop that corresponds to the DSL capacity in the table.

11. The method of claim 1, wherein the using includes:
determining the particular length of the straight loop from information regarding at least one of bridged-taps, gauge, temperature, or insulation type associated with the existing telephone loop.

12. The method of claim 1, wherein the determining DSL performance for the equivalent loop includes:
selecting DSL performance data from a plurality of previously-obtained DSL performance data.

13. The method of claim 1, wherein the determining DSL performance for the equivalent loop includes:
selecting DSL performance data from a plurality of DSL performance data for loops of different lengths under different crosstalk conditions.

14. The method of claim 1, wherein the predicting includes:
determining spectral interference conditions associated with the existing telephone loop, and
predicting the DSL performance of the existing telephone loop based on the DSL performance for the equivalent loop and the determined spectral interference conditions.

15. A system for estimating digital subscriber line (DSL) performance on customer telephone loops, comprising:
a memory configured to store instructions; and
a processor configured to execute the instructions to:
receive information regarding the customer telephone loops,
determine a DSL capacity of each of the customer telephone loops from the received information for the customer telephone loops,
identify equivalent loops being different from the customer telephone loops, the different loops being limited to straight physical loops of one or more particular lengths and a corresponding one or more particular gauges and being equivalent to the customer telephone loops based on the received information, wherein the DSL capacity corresponding to each of the customer telephone loops is used to identify the equivalent loops,
determine DSL performance for the equivalent loops by considering physical characteristics of the equivalent loops, and
estimate DSL performance for the customer telephone loops from the determined DSL performance for the equivalent loops.

16. The system of claim 15, wherein when receiving information regarding the customer telephone loops, the processor is configured to receive at least one of a frequency, length, gauge, temperature, or insulation type associated with each of the customer telephone loops.

17. The system of claim 15, wherein the processor is further configured to determine an insertion loss for each of the customer telephone loops based on the received information for the customer telephone loops.

18. The system of claim 17, wherein the processor is further configured to determine a DSL capacity of each of the customer telephone loops using the insertion loss for the existing telephone loops.

19. The system of claim 18, wherein when determining a DSL capacity of each of the customer telephone loops, the processor is configured to create a loss curve using the insertion loss and integrate the loss curve to determine the DSL capacity of the customer telephone loop.

20. The system of claim 18, wherein when determining a DSL capacity of each of the customer telephone loops, the processor is configured to create a loss curve based on the insertion loss over a plurality of frequencies and determine an area below the loss curve over the plurality of frequencies, the area corresponding to the DSL capacity of the customer telephone loop.

21. The system of claim 18, wherein each of the customer telephone loops includes an upstream path and a downstream path; and
wherein when determining a DSL capacity of each of the customer telephone loops, the processor is configured to separately determine the DSL capacity for each of the upstream and downstream paths.

22. The system of claim 15, wherein each of the customer telephone loops includes an upstream path and a downstream path; and
wherein when determining a DSL capacity of each of the customer telephone loops, the processor is configured to separately determine the DSL capacity for each of the upstream and downstream paths.

23. The system of claim 22, wherein the processor is configured to determine equivalent loops corresponding to each of the upstream and downstream paths.

24. The system of claim 15, wherein the processor is configured to locate the DSL capacity corresponding to each of the customer loops in a table and find the equivalent loops that correspond to the DSL capacities in the table.

25. The system of claim 15, wherein the processor is configured to determine the one or more particular lengths of the straight loops from information regarding at least one of bridged-taps, gauge, temperature, or insulation type associated with each of the customer telephone loops.

26. The system of claim 15, wherein when determining DSL performance for each of the equivalent loops, the processor is configured to select DSL performance data from a plurality of previously-obtained DSL performance data.

27. The system of claim 15 wherein when determining DSL performance for each of the equivalent loops, the processor is configured to select DSL performance data from a plurality of DSL performance data for loops of different lengths under different crosstalk conditions.

28. The system of claim 15, wherein the processor is configured to determine spectral interference conditions associated with each of the customer telephone loops and predict the DSL performance of the customer telephone loops based on the DSL performance for the equivalent loops and the determined spectral interference conditions.

29. A method for predicting asymmetric digital subscriber line (ADSL) performance on an existing telephone loop, comprising:

determining characteristics and operating conditions of the existing telephone loop;

calculating ADSL capacity of the existing telephone loop based on the determined characteristics;

identifying a different, test loop limited to a physical loop of a particular length and a particular gauge that is equivalent to the existing telephone loop based on the ADSL capacity and the determined operating conditions of the existing telephone loop;

determining ADSL performance on the equivalent different, test loop by considering physical characteristics of the different, test loop; and predicting ADSL performance on the existing telephone loop from the determined ADSL performance on the equivalent different, test loop.

\* \* \* \* \*